(12) United States Patent
Seagle

(10) Patent No.: US 6,254,776 B1
(45) Date of Patent: Jul. 3, 2001

(54) SYSTEM AND METHOD FOR TREATING ANIMAL WASTE

(75) Inventor: Edward D. Seagle, Andrews, NC (US)

(73) Assignee: Agrimicrobe Sales, L.C., Brodnax, VA (US)

( * ) Notice: Subject to any disclaimer, the term of this patent is extended or adjusted under 35 U.S.C. 154(b) by 0 days.

(21) Appl. No.: 09/376,053

(22) Filed: Aug. 17, 1999

(51) Int. Cl.⁷ ........................................ C02F 3/02
(52) U.S. Cl. ................. 210/603; 210/604; 210/620; 210/153; 210/188; 210/220; 210/916; 119/447; 119/448; 119/450
(58) Field of Search ................. 210/603, 604, 210/620, 747, 153, 194, 188, 218, 220, 916; 119/447, 448, 450, 527

(56) References Cited

U.S. PATENT DOCUMENTS

| | | | | |
|---|---|---|---|---|
| 3,335,082 | * | 8/1967 | Ullrich | 210/916 |
| 3,884,804 | * | 5/1975 | Robinson et al. | 210/916 |
| 3,927,644 | * | 12/1975 | Nafziger . | |
| 4,201,663 | * | 5/1980 | Rollag et al. | 210/916 |
| 4,421,534 | * | 12/1983 | Walker | 210/916 |
| 4,486,310 | * | 12/1984 | Thornton | 210/604 |
| 4,894,162 | * | 1/1990 | Cournoyer et al. | 210/603 |
| 5,080,793 | * | 1/1992 | Urlings | 210/603 |
| 5,136,980 | * | 8/1992 | Schoeber et al. | 210/916 |
| 5,451,320 | * | 9/1995 | Wang et al. | 210/604 |
| 5,587,081 | * | 12/1996 | Norcross et al. | 210/604 |
| 5,666,905 | * | 9/1997 | Mackin et al. | 119/450 |
| 5,983,834 | * | 8/1999 | Tai | 119/448 |

FOREIGN PATENT DOCUMENTS

| | | | |
|---|---|---|---|
| 674004 | * | 4/1990 | (CH) . |
| 732215 | * | 5/1980 | (SU) . |

* cited by examiner

Primary Examiner—Christopher Upton
(74) Attorney, Agent, or Firm—Reed Smith Hazel & Thomas LLP

(57) ABSTRACT

A system and method for treating farm animal waste, such as hog and poultry waste, to remove volatile organic compounds (VOCs) from wastewater treatment pits and thus control smell is disclosed. The farm animals are housed in structures equipped with grated flooring to permit animal waste to fall into pits or reservoirs below. The pits contain water inoculated with a special assemblage of natural microbes to which oxygen is supplied through piping arranged in the pits. These special microbes have an affinity for ammonia and convert much of the animal waste into carbon dioxide, fatty acids, and water. The system also includes a second piping network situated beneath the grated flooring which serves to create a negative air situation by which escaping foul-smelling air is pulled back into the wastewater to permit further action on the VOCs by the microbes in the water.

12 Claims, 1 Drawing Sheet

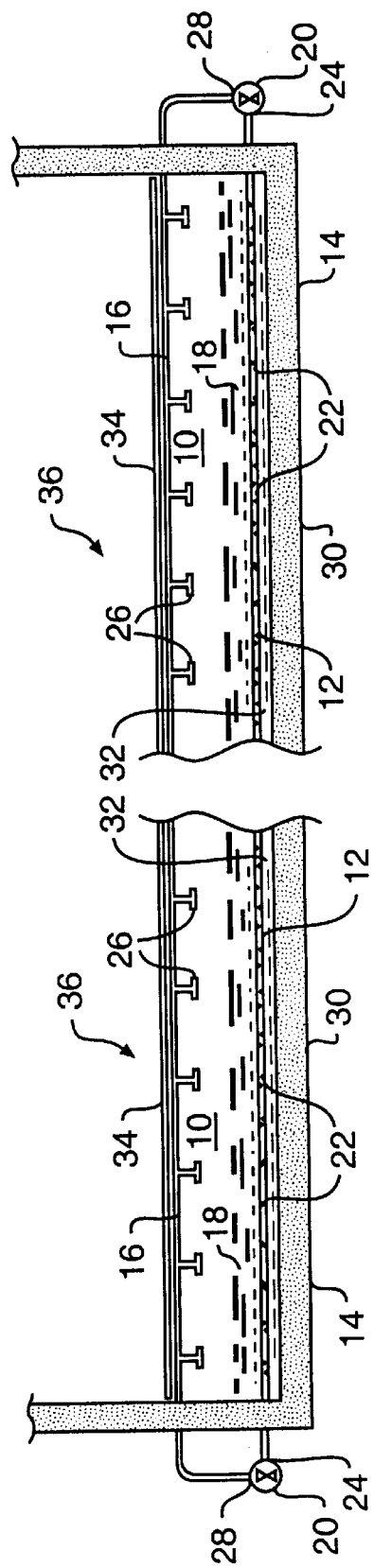

SYSTEM AND METHOD FOR TREATING ANIMAL WASTE

BACKGROUND OF THE INVENTION

1. Field of the Invention

The present invention relates to a system and method for treating farm animal waste, such as hog and poultry waste, to remove volatile organic compounds (VOCs) from wastewater treatment pits and thus control smell. The farm animals are housed in structures equipped with grated flooring to permit animal waste to fall into pits below. The pits contain water inoculated with a special assemblage of natural microbes to which oxygen is supplied through PVC piping arranged in the pits. These special microbes have an affinity for ammonia and convert much of the animal waste into carbon dioxide, fatty acids, and water.

The system of the invention also includes a second piping network situated between the wastewater treatment pits and the grated flooring which serves to create a negative air situation by which escaping foul-smelling air is pulled back into the wastewater to permit further action on the VOCs by the microbes in the water.

This bioremediation process results in less odor emitted and fewer waste solids to be disposed of, further processed, or placed directly in storage lagoons.

2. Description of the Prior Art

There has been an ongoing conflict between environmentalists and large-scale livestock producers, particularly hog and chicken farmers. In the case of hog farming, lagoons are used as outdoor storage for animal waste. These lagoons can vary in size from less than an acre to more than 25 acres. Typically, hogs are housed in structures with slatted decks or otherwise grated floors so as to allow excrement to fall through the openings in the grating into wastewater pits below the grating. The animal excrement is stored in the pits until being emptied into one of the aforesaid holding lagoons.

Animal waste pits currently in operation vary in depth as well as in frequency of solid waste removal. Hog waste systems in the Eastern and Southeastern United States utilize pits with water about 12 inches deep. About every 7 days, the pits are emptied into a holding lagoon. Water from the top of the lagoon is pumped back to recharge the pits after waste solids have settled in the lagoon. When soil conditions permit, water from the lagoon is sprayed on crop land for fertilization to prevent the lagoon from overflowing. In colder regions, the pits may be much deeper to permit storage for longer periods or until application to crop land by spraying is possible.

These lagoons leak manure into underground water systems, and carry a very offensive odor. The odor from such farms has caused environmentalists and individual land owners to call for a ban on open-air manure lagoons, or at least very strict government regulation of same, including limitations on when hog effluent may be sprayed as fertilizer on surrounding fields. The stench intensifies with larger quantities of waste, higher ambient air temperature, and poor air quality in general, among other factors.

There has also been an established link between hog farm odors and illness in people inhabiting the areas adjacent large hog facilities. Researchers at the University of Iowa found an unusually high rate of respiratory problems among people who lived near a 4,000-sow hog confinement facility. The symptoms, which include chronic bronchitis, occupational asthma, chronic sinusitis, and organic dust syndrome, were similar to those documented among hog factory workers worldwide, and are believed to be attributable, at least in part, to the toxic gases hydrogen sulfide and ammonia associated with hog waste odor.

There therefore exists a need for efficient methods and systems to reduce the amount and/or intensity of odors emanating from hog farm waste lagoons which is both economical and adaptable to various sizes of farming establishments.

In conventional treatment systems, the animal waste is left to be broken down in the lagoons by natural anaerobic microorganisms, which results in very foul odors. It would be prohibitively expensive to equip these large lagoons with motors and supply the power for oxygen to support aerobic microorganisms which would give off less disagreeable odors and break down the waste solids faster. In addition, the prior art systems depend on indigenous microbes that vary in effectiveness geographically.

Many technologies are now being tested to control animal waste odors and to affect the nitrogen and phosphorus content of the waste solids. These methods include additives to the diet, separation of solids, chemical processing of the waste solids, composting, catalytic reactors, etc.

For example, researchers at Purdue University have investigated the relationship between manure odor and swine diets, and have found that reducing the crude protein in the hogs' diet and supplementing it with essential amino acids effectively reduces nitrogen excretion by 20–42% and ammonia concentration by 25–42%. However, smaller hog farmers may not be able to afford or may be unwilling to invest in odor-control technologies that do not add to farm profitability.

A cultured wetlands approach has been used successfully worldwide to reduce odors using a bacteria spread over the surface of the wetlands to digest the nutrients, antibiotics and heavy metals contained in the manure. However, a typical cultured wetlands approach involves the creation of about one mile of push-up terraces and six water channels over a 5-acre plot. Gates between the water channels must also be erected to allow for water flow. Moreover, the bacteria requires a 10 day incubation period before it is effective in degrading the manure. Obviously, this approach is too time, cost, and land consuming to be feasible in many animal farm establishments.

The "Slurry/Masster" technology which is known in the art separates the solids from the liquids in hog manure by adding a chemical to the slurry that causes clumping or flocculation. Once the slurry has been mixed with the flocculants, it is passed over a screen to separate the solids from the liquids, where the liquids are directed to irrigation pipes and the solids are processed into fertilizer.

Researchers at Southern Illinois University are developing a catalytic reactor that could cut swine barn odors caused by para-cresol, a highly concentrated chemical compound found in swine buildings. The building's air is drawn through catalytic converters to speed up the reaction between para-cresol and oxygen to produce carbon dioxide and water. This system will require both high temperature (about 150° C.) and a synthesized catalyst capable of breaking down para-cresol completely.

Some hog farms in the far North and Northwestern United States have utilized chopped straw to cover clay-lined manure storage basins in an attempt to reduce odor. Straw covers have been used in Canada in this manner for 10–15 years. However, manure lagoons are not used in hog farming in these geographical errors.

U.S. Pat. No. 5,176,823 shows an odor control system incorporating a conventional hood apparatus over a wastewater settling tank to draw air containing VOCs from the waste into a scrubber.

U.S. Pat. No. 5,472,472 describes a process for converting animal waste excrement into ecologically manageable materials. The solids in an aqueous slurry of animal excrement are precipitated in a solids ecoreactor. The treated slurry is then passed to a bioreactor zone where soluble phosphorus is precipitated with metallic salts. The remaining slurry is then aerobically and anaerobically treated to form an active biomass that actively bioconverts the remaining soluble phosphorus, and the slurry is passed to an ecoreactor zone for conversion to a beneficial humus material. Reduction of odor is a side effect of this process. However, the apparatus and procedure is cumbersome and costly, and would not be feasible for hog farmers who do not also trade in soil enhancing products.

Thus, there remains a need in the industry for a system that will effectively bioremediate a wide range of gases and volatile organic compounds in order to reduce animal waste effluvia as well as the amount of solid material in animal waste pits. The system should also be useable in varying geographical regions and in animal farming establishments of varying size and sophistication.

SUMMARY OF THE INVENTION

It is therefore an object of the present invention to provide a system using aerobic microbes that will effectively bioremediate a wide range of gases and volatile organic compounds in order to reduce odor from farm animal waste and to break down the solid organic components of the animal waste into carbon dioxide, fatty acids and water. The invention incorporates a negative air arrangement to pull or draw VOC-containing air released from the waste water pits back down into the pit water, rather than releasing the foul-smelling air from the housing structure into the environment.

A further object of the present invention is to provide a system that will be adaptable to and effective in a wide range of geographical locations.

A further object of the present invention is to provide a system that may be customized to treat waste animal waste on both large and small scale farming operations.

In general, the present invention is directed to an apparatus and method for destroying the pollutants and odoriferous organic compounds in farm animal waste by microbial degradation or bioremediation. Bioremediation is an in-situ process for remediating soils and groundwater, targeting higher weight petroleum compounds having more than 15 carbon atoms, and chlorinated, nitrated, oxygenated and saturated organic compounds. During the bioremediation process, organic matter is converted by microorganisms to carbon dioxide, water, biomass and inorganic salts.

In at least one embodiment, the present invention is composed of a reservoir or pit that contains a water bath inoculated with microorganisms that are selected to degrade farm animal waste, particularly hog or chicken waste. The reservoir or pit is positioned under a slatted deck or grate flooring on which the animals are housed, such that there is a space between the top of the water bath and the bottom of the deck or flooring. Piping, which may preferably be PVC piping, is arranged to run through the water bath to aerate it and provide oxygen to the microbes. An air compressor is provided to force the air through the piping and into the wastewater.

A second piping network is provided in the space between the water bath and the deck or flooring structure. The second piping network is connected to the intake side of the air compressor, and pulls air down through the grating of the deck or flooring structure to create a negative pressure above the wastewater.

As the animals urinate and defecate, the waste material passes through the openings in the deck or flooring structure and into the water bath contained in the pit or reservoir. The special assemblage of natural aerobic microbes (available from AgriMicrobe Sales of Brodnax, Virginia under the trademark AGRIMICROBE SALES FORMULA V™) which have been added to the water bath degrade the ammonia in the urine and bioremediate the compounds in the feces, thereby reducing odor and minimizing solid waste material in the water bath.

However, the bubbles from the air forced through the piping system into the water bath tend to burst and carry any foul smelling odors which remain after the action of the microbes upwards from the water bath and into the ambient air. These escaping fumes are prevented from escaping into the atmosphere by the negative air situation caused by the second piping system. The second piping system continuously pulls or draws air through the grating to create a negative pressure situation which forces the escaping foul air back down into the water bath for further action by the microbes.

The expected reduction in solid waste material and the avoidance of ammonia exposure to the hogs residing above the pits should lengthen the holding time of the waste material in the pit before being moved to the open-air lagoon. The reduction in quantity of solid waste material and any change in the nutritional composition of the waste solids will concomitantly reduce the open lagoon space required, and in smaller farms may eliminate the need for lagoons altogether.

The system of the present invention will require a comparatively modest investment to equip existing hog houses with the piping systems and air compressors and to purchase the special aerobic microbes for addition to the waste water. Ongoing costs are limited to maintenance and the cost of electricity to run the compressor motors. The system of the invention will be more efficient at reducing odors and quantity of waste solids than the prior art systems, at a lower cost.

BRIEF DESCRIPTION OF THE DRAWING

The invention will be further described in conjunction with the accompanying drawings in which:

FIG. 1 is a side overall view of the preferred embodiment of the present invention.

DETAILED DESCRIPTION OF THE PREFERRED EMBODIMENT

With reference to FIG. 1, the present invention is directed to an odor control system 10 that is composed of a first piping system 12 extending through the wastewater 18 in an animal waste treatment reservoir 14, and a second piping system 16 positioned above the wastewater 18 in the waste treatment reservoir 14. The first piping system 12 and the second piping system 16 are connected to an air compressor 20 provided outside of the reservoir 14. The first piping system 12 is provided with aeration holes 22 and is connected to outlet port 24 of the air compressor 20. The second piping system 16 is provided with air suction members 26 and is connected to inlet port 28 of the air compressor 20. During operation of the system 10, the circulation of the air through the piping systems and the compressor is continuous.

The waste treatment reservoir 14 is itself constructed of a bottom portion 30, side portions 32, and a grate or slatted deck 34 positioned between the side portions 32 and at a distance above bottom portion 30 sufficient to contain the system 10. The bottom portion 30, side portions 32 and grate 34 define a waste treatment chamber 36. One or more waste treatment chambers 36 are installed in an animal housing structure (not shown), and the grate 34 serves as the flooring for the housed animals (not shown).

The wastewater 18 is inoculated with natural aerobic microbes, which are preferably AGRIMICROBE SALES FORMULA V™ microbes (not shown). The amount of microbes put into the water and maintained thereafter is generally set at a level consistent with levels that can be discharged into a city sewer system or a septic tank system, or can be sprayed onto the ground.

During operation, waste excreted from the housed animals passes through openings in the grate 34 and falls into the wastewater 18 of the treatment reservoir 14. The aerobic microbes contained in the wastewater degrade the ammonia in the animals' urine and bioremediate the compounds in the animals' feces. The aerobic microbes are oxygenated by the air forced through holes 22 in the first piping system 12 by the compressor 20.

However, the forced air creates bubbles (not shown) in the wastewater 18, which bubbles burst and may carry undigested VOCs and the odor associated therewith upwards from the water and into the air in the chamber 36, and ultimately to the air outside the animal housing unit. This is prevented by the action of the second piping system 16 which draws air down through the suction members 26 and forces the escaping foul air back into the wastewater 18 for further treatment by the aerobic microbes.

In general, the components of the system 10 and the chamber 16 may be constructed from materials known in the art that are capable of supporting the structural loads applied to them, and of not deteriorating with exposure to water, the contaminants to be processed, microbiological growths and the products of microbiological reactions. Such materials include but are not limited to stainless steel, PVC, reinforced fiberglass, painted carbon steel and coated carbon steel.

The first piping system 12 is preferably constructed of one or more 1½" diameter PVC pipes having ⅜" holes spaced at intervals over the length and around the circumference of the pipe tube to evenly aerate the wastewater and consequently oxygenate the aerobic microbes. The second piping system 16 is preferably constructed of one or more 1½" diameter PVC pipes having 1½" PVC suction tees extending in a vertical direction downward from the underside of the pipe tube. The tees are spaced at intervals over the length of the pipe tube to ensure a constant negative pressure over the surface of the wastewater.

For ease of cleaning and for optimum durability, the bottom 30 and the sides 32 of the chamber 36 are preferably constructed of concrete, and the grate 34 is preferably fiberglass, slatted flooring. When used in hog farming, the fiberglass flooring preferably has approximately 70% solid space and 30% open space to permit clear passage of fecal droppings as well as good air-drawing ability.

The first and second piping systems 12, 16 are preferably detachable and removable from the system for added ease of cleaning.

The microbes sold under the trademark AGRIMICROBE SALES FORMULA V™ are preferred based on the fact that this particular formulation of naturally-occurring aerobic microorganisms has been shown to effectively bioremediate a wide range of organic waste materials by converting them into non-toxic components. In addition, that formula has the advantages of being formed as a dry, powder material with a 5-year shelf life, being usable in either fresh or salt water, having a high concentration of 100 billion cells per gram, and being non-toxic itself. The formula is composed of a microorganism mixture of single cell bacteria and enzymes ranging in size from 1 to 10 microns, with a pH range of 5.50 to 10.00 and a temperature tolerance of 35 to 120° F.

The present invention may use other microbe formulas that can achieve bioremediation and that have characteristics similar to the AGRIMICROBE SALES FORMULA V™ discussed above.

Although the present invention has been fully described in connection with the preferred embodiment thereof with reference to the accompanying drawing, it is to be noted that various changes and modifications will be apparent to those skilled in the art. For example, the system may be varied depending upon the size, type and/or location of the animal farm according to the needs of the farmer, the surrounding community, and the intended end-use of the treated waste material. Such changes and modifications are to be understood as included within the scope of the present invention as defined by the appended claims, unless they depart therefrom.

What is claimed is:

1. An odor control system using bioremediation, comprising:
    a reservoir located beneath and air-communicating directly with an animal house in which animal waste is generated, said reservoir having a water bath inoculated with aerobic microbes;
    means for providing oxygen-containing air to the water bath;
    means for creating a negative pressure over the bath to prevent odor-laden air from escaping the water bath; and
    means for delivering said animal waste to the microbe-inoculated water bath.

2. A system according to claim 1, wherein the aerobic microbes are AGRIMICROBE SALES FORMULA V™ microbes, a mixture of 18 naturally occurring microbes.

3. A system according to claim 1, wherein the means for providing air to the water bath is a pipe system.

4. A system according to claim 1, wherein the means for creating a negative pressure over the water bath is a pipe system.

5. An odor control system using bioremediation, comprising:
    a reservoir having a lower tank portion in which a water bath inoculated with aerobic microbes is maintained;
    a first air piping system provided within the water bath, said first piping system having aeration holes which provide oxygen to the microbes in the water bath; and
    a second air piping system mounted over the water bath, said second piping system having air suction members which create a negative pressure over the water bath;
    wherein said first and second air piping systems are connected to an air compressor provided outside of the reservoir, and
    said water bath, and said first and second piping systems are positioned beneath a flooring of a housing structure for farm animals, said flooring having openings therein whereby waste excreted from the animals falls through the openings and into the microbe-inoculated water bath.

6. A system according to claim 5 wherein said first air piping system is connected to an output port of the air compressor and said second air piping system is connected to an input port of the air compressor.

7. A system according to claim 6 wherein said flooring is slatted fiberglass, and the first and second piping systems are comprised of PVC pipes and pipe fittings.

8. A system according to claim 6 wherein said aerobic microbes are AGRIMICROBE SALES FORMULA V™ microbes, a mixture of 18 naturally occurring microbes.

9. A bioremediation method for removing odor from animal waste comprising:

provinding a reservoir located beneath and air-communicating directing with an animal house in which the animal waste is generated;

adding the animal waste to a water bath contained in the reservoir, the water bath being inoculated with aerobic microbes;

aerating the water bath; and creating a negative pressure over the water bath to prevent odor-laden air from escaping the water bath.

10. A method according to claim 9 wherein the aerobic microbes are AGRIMICROBE SALES FORMULA V™ microbes, a mixture of 18 naturally occurring microbes.

11. A bioremediation method for removing animal waste odor from an animal housing structure having a grated flooring which permits passage of animal waste to a reservoir provided beneath the flooring, said method comprising the steps of:

providing a wastewater treatment bath inoculated with aerobic microbes in the reservoir;

providing a first air piping system having aeration holes within the wastewater treatment bath, the first air piping system being connected to an outlet port of an air compressor located outside of the reservoir; and providing a second air piping system having suction members over the wastewater treatment bath, the second air piping system being connected to an inlet port of the air compressor; and continuously generating an air circuit through the air compressor such that oxygen-containing air is released through the aeration holes in the first air piping system to the microbes in the water bath, and such that a negative pressure is maintained above the water bath by the second air piping system to prevent odor from escaping from the reservoir with the air generated by the first air piping system.

12. A method according to claim 11 wherein the aerobic microbes are AGRIMICROBE SALES FORMULA V™ microbes, a mixture of 18 naturally occurring microbes.

* * * * *